United States Patent

[11] 3,597,993

| [72] | Inventor | Marion M. Ripley |
| | | 19 Compass Road, Baltimore, Md. 21220 |
| [21] | Appl. No. | 873,789 |
| [22] | Filed | Nov. 4, 1969 |
| [45] | Patented | Aug. 10, 1971 |

[54] COLLAPSIBLE STEERING COLUMN MOUNT ARRANGEMENT
4 Claims, 3 Drawing Figs.

[52] U.S. Cl. ................................................. 74/492
[51] Int. Cl. ................................................. B62d 1/18
[50] Field of Search ................................ 74/492, 493

[56] References Cited
UNITED STATES PATENTS
| 2,227,821 | 1/1941 | Burrell | 74/493 |
| 2,511,165 | 6/1950 | Lyman | 74/493 |

*Primary Examiner*—Milton Kaufman
*Attorney*—Walter G. Finch

ABSTRACT: A safety steering column mount arrangement for motor vehicles arranged to collapse upon an impact is provided. The lower and upper sections of the housing and the lower and upper sections of the steering shaft are each telescopic and separately bias with compression coiled springs.

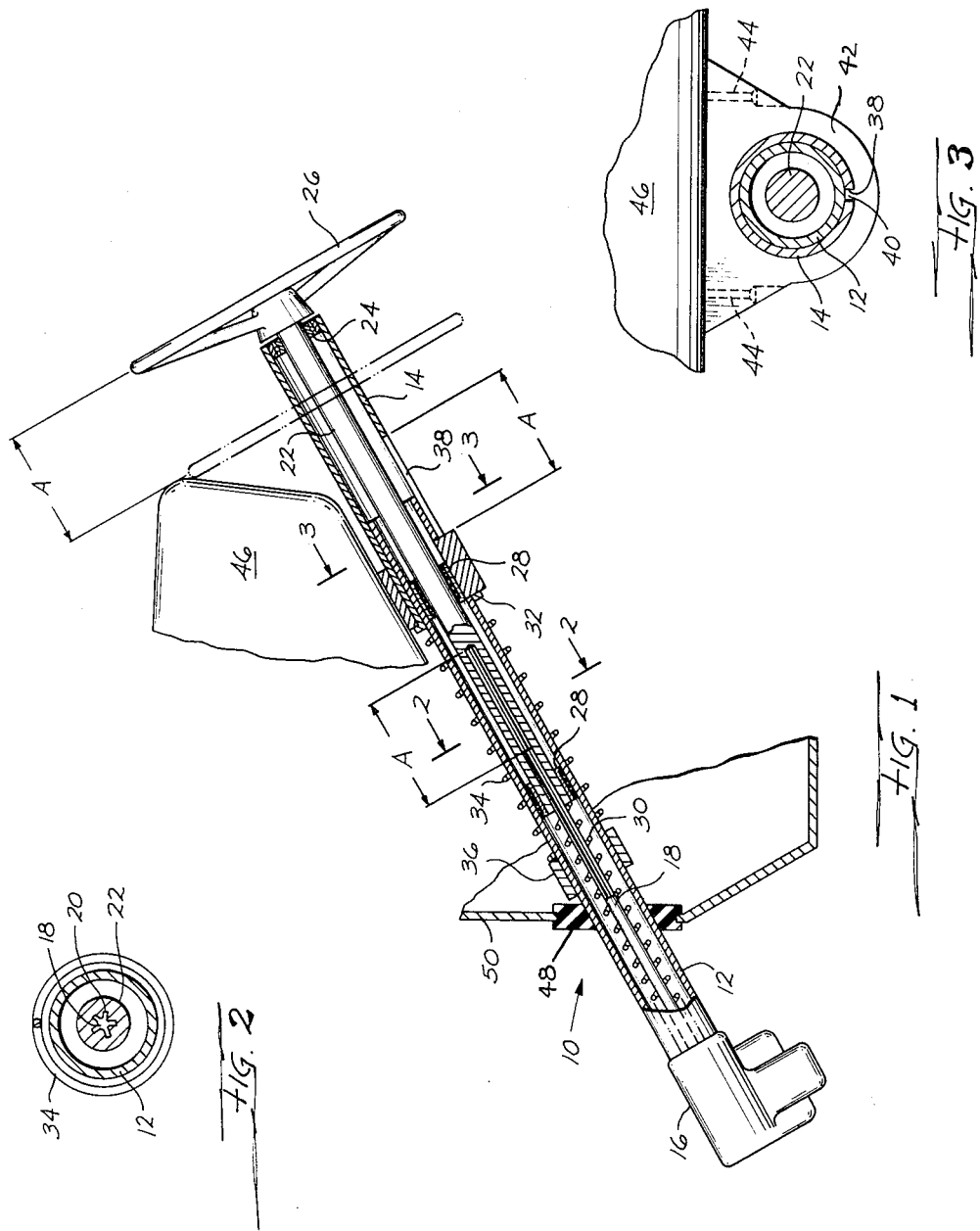

COLLAPSIBLE STEERING COLUMN MOUNT ARRANGEMENT

This invention relates generally to automotive vehicles, and more particularly to a collapsible steering column mount arrangement for motor vehicles which is arranged to collapse upon an impact.

In case of a moor car accident, a rigid steering column almost invariably causes chest or head injuries. Collapsible steering columns are not new, but have generally been designed to give way in a self-destructive or more or less permanent manner. This is, of course, satisfactory for a major collision, but for sudden stops a disabled steering column is not desirable.

It is an object of this invention, therefore, to provide a collapsible steering column assembly which is self-restoring after functioning on moderate impacts.

Another object of this invention is to provide a steering column which provides for collapse in a first soft stage and subsequent hard impact stage.

Other objects and attendant advantages of this invention will become more readily apparent and understood from the following detailed specification and accompanying single sheet of drawings in which:

FIG. 1 is a longitudinal cross-sectional view illustrating the steering column arrangement according to this invention as mounted within the body of a vehicle;

FIG. 2 is a cross section taken on line 2-2 of FIG. 1; and

FIG. 3 is a cross section taken on line 3-3 of FIG. 1.

Referring now to the details of the invention as shown in the drawings, reference numeral 10 indicates generally a collapsible steering column embodying principles of this invention. The collapsible steering column 10 consists of a lower housing tube 12 and an outer housing tube 14, the former being of smaller sliding telescopic fit and extending from within the latter.

A steering gear box 16 is secured on the lower end of the tube 12 and a steering shaft 18 extends upwardly therewithin. The upper end of a shaft 18 is splined as shown in FIG. 2 and fits slidably into a female spline 20 formed inside a wheel shaft 22 which continues upwardly through the housing tube 14.

After passing through a bearing 24 at the upper end of this housing tube 14, the extended end of the wheel shaft 22 mounts a steering wheel 26.

A spaced pair of linear ball bearings 28 support this wheel shaft 22 at its lower end and at an intermediate point within the lower housing tube 12 for free reciprocation therein. The lower end of the wheel shaft 22 bears against a compression-coiled spring 30 which surrounds the lower portion of the steering shaft 18 and extends from an abutting position within the gear box 16.

A flange 32 is provided on the lower end of the outer housing tube 14. This flange 32 bears against a compression-coiled spring 34 which surrounds the lower housing tube 12 and extends upwardly from an abutting position on a collar 36. The collar 36 is securely fastened to the tube 12 intermediate its ends so as to function as a ram as will be related.

A longitudinal slot 38 is provided in the under side of the outer tube 14 and it extends from the flange 32. This slot 38, as best shown in FIG. 3, receives a key or projection 40 on a mounting bracket 42 which slidably journals the outer tube 14. This bracket 42 is mounted with screws 44 to the underside of the vehicle dash 46.

A rubber grommet 48 in the firewall 50 of the vehicle supports the lower housing tube 12 at a position below the collar 36.

In operation, the springs 30 and 34 work in parallel to absorb the energy of an axial displacement well within the range shown by the arrows A in the case of a sudden stop of the vehicle and nondestructively restore thereafter.

In the case of a major collision with another vehicle or object, the springs 30 and 34 compress completely and the collar 36 functions as a ram to force the grommet 48 from the fire wall 50, thus allowing the entire steering column 10 to shift forwardly out of a dangerous position to the operator.

Obviously many modifications and variations of the present invention are possible in light of the above teachings. It is, therefore, to be understood that within the scope of the appended claims the invention may be practiced otherwise than as specifically described.

I claim:

1. A collapsible safety steering column mount arrangement for a motor vehicle arranged to collapse upon impact with an object, comprising, structure having a lower housing tube with collar means on its outer surface positioned intermediate the ends thereof, means for supporting said lower housing tube in the firewall of said vehicle at a position below said collar means, an upper and outer housing tube having a flange provided on its lower end, said lower housing tube being of smaller telescopic fit and extending partially from within said upper and outer housing tube, means including a steering gear box secured on the lower end of said lower housing tube, with a steering shaft extending upwardly from said gear box into said lower housing tube, wheel shaft means having a steering wheel on one end and with its other extending downwardly into said upper housing tube and into said lower housing tube, means positioned in the interior of said wheel shaft means for coupling said steering shaft to said wheel shaft means, means for supporting said wheel shaft means at spaced points within said lower housing tube for free reciprocation therein, first compression spring means surrounding the lower portion of said steering shaft and having its opposite ends positioned against the lower end of said wheel shaft means and an abutting position within said gear box and arranged so as to bias said wheel shaft means upwardly in said lower housing tube, a second compression spring means positioned between said flange means of said outer housing tube and said collar means of said lower housing tube so as to bias said lower housing tube and outer housing tube apart, slot means provide in the under side of said outer housing tube and extending from said flange of said outer housing housing tube and extending from said flange of said outer housing tube, bracket means adapted to be secured to said vehicle, and key means being positioned in said slot and mounted on said bracket means, with said first and second compression spring means being arranged to work in parallel to absorb the energy of an axial displacement of said steering column in case of a sudden stop of said vehicle and nondestructively restoration thereafter; and in case of a major collision of said vehicle with another vehicle or object, said first and second compression means compress completely, with said collar means functioning as a ram to force said lower housing support means from said firewall, thus allowing said entire steering column to shift forwardly out of a dangerous position to the operator of said vehicle.

2. A collapsible steering column mount arrangement as recited in claim 1, wherein said first and second compression spring means consist of coiled springs.

3. A collapsible steering column mount arrangement as recited in claim 1, wherein said means for coupling said steering shaft means and said wheel shaft means comprises a female spline.

4. A collapsible steering column mount arrangement as recited in claim 1, wherein said means for supporting said wheel shaft at spaced points consists of linear ball bearing.